United States Patent [19]

Shue

[11] 4,097,469

[45] Jun. 27, 1978

[54] PROCESS FOR PREPARING POLYAMIDES OF PACP

[75] Inventor: Robert S. Shue, Bartlesville, Okla.

[73] Assignee: Phillips Petroleum Company, Bartlesville, Okla.

[21] Appl. No.: 677,210

[22] Filed: Apr. 15, 1976

[51] Int. Cl.$^2$ ............................................. C08G 69/28
[52] U.S. Cl. ........................... 260/78 R; 260/45.75 R
[58] Field of Search ...................................... 260/78 R

[56] References Cited

U.S. PATENT DOCUMENTS 3,211,705  10/1965  Gadecki ............................. 260/78 R
3,840,501  10/1974  Shue et al. ......................... 260/78 R Primary Examiner—Harold D. Anderson

[57] ABSTRACT

A process for preparing polyamides of 2,2-bis(4-aminocyclohexyl)-propane (PACP) or methyl derivatives thereof with a $C_8$ to $C_{12}$ straight chain alkane dicarboxylic acid, or mixture thereof with adipic acid, which comprises preparing a moderate molecular weight prepolymer of the diamine and diacid or diacid mixture employing a manganous hypophosphite/water catalyst system, and thereafter condensing the prepolymer to a high molecular weight product.

45 Claims, No Drawings

PROCESS FOR PREPARING POLYAMIDES OF PACP

FIELD OF THE INVENTION

The invention relates to polyamides of PACP or of its methyl derivatives with $C_8$ to $C_{12}$ dicarboxylic acids, optionally with adipic acid. In another aspect, the invention relates to a method of preparing polyamides of PACP or methyl derivatives thereof with $C_8$ to $C_{12}$ dicarboxylic acids, optionally with adipic acid.

BACKGROUND OF THE INVENTION

It has been difficult to obtain polyamides of 2,2-bis(4-aminocyclohexyl)propane (PACP) and its methyl derivatives with diacids possessing a really sufficiently high inherent viscosity. Progress toward making same has been generally unrewarding, or not sufficiently successful to provide a viable commercial product. Methods directed toward preparation of products with high inherent viscosity have resulted in products which cannot be extruded from conventional autoclaves after polymerization, and thus are exceedingly hard to recover from the preparatory equipment so as to be utilized in any reasonable fashion.

The vast potentialities for polyamides of PACP and its methyl derivatives await a viable method of preparation of the polyamides.

SUMMARY OF THE INVENTION

I have discovered a process for making high molecular weight polymers of (A) PACP, or its methyl derivatives, with (B) at least one $C_8$ to $C_{12}$ straight chain alkane diacid, or mixture thereof with adipic acid, by a two stage process. A prepolymer of a moderate inherent viscosity is first formed using a novel catalyst system comprising manganous hypophosphite and water, followed by second-stage polycondensation of the prepolymer to a high molecular weight product with a high inherent viscosity.

DETAILED DESCRIPTION OF THE INVENTION

In accordance with my invention, high molecular weight polymers of (A) PACP or its methyl derivatives with (B) alkane dicarboxylic acids are prepared in a two-stage polymerization. The process comprises preparation of a prepolymer of the diamine and diacid monomer or monomers employing a catalyst system comprising manganous hypophosphite and water. The prepolymer so-prepared has a sufficient residual polymerization capability so as to permit condensation polymerization to high molecular weight products. This finishing step or conversion step can optionally employ low levels of manganous hypophosphite.

While I do not wish to be bound by theoretical considerations in view of my highly effective operable process which is convenient and easy to use, nevertheless it presently appears that the prepolymer product prepared between the diamine and diacid monomers employing the manganous hypophosphite/water catalyst system results in a moderate molecular weight (moderate inherent viscosity) prepolymer having a sufficient balance and number of residual, unreacted, acid and amine end-groups which permit condensation polymerization of this prepolymer to a high molecular weight product.

Diamines

The (A) diamine employed is PACP or its methyl derivatives, more particularly 2,2-bis(4-aminocyclohexyl)propane and its monomethyl and dimethyl derivatives, such that each ring is substituted with not more than one methyl group. The PACP or methyl derivatives thereof can be represented by the formula

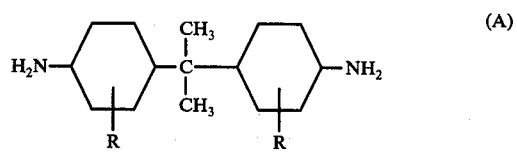

wherein each R is selected from hydrogen and methyl radicals. Any of the geometric isomers can be employed as can mixtures of the diamines.

Diacids

The (B) diacids employed are the $C_8$ to $C_{12}$ straight chain alkane dicarboxylic acids, one or more or in admixture with the $C_6$ diacid, adipic acid. Thus, the polymers prepared in accordance with my invention are polymers of (A) PACP or a methyl derivative thereof with either (B1) at least one $C_8$ to $C_{12}$ straight chain alkane dicarboxylic acid, or (B2) a mixture of hexanedioic acid (adipic acid) with at least one $C_8$ to $C_{12}$ straight chain dicarboxylic acid. The $C_8$ to $C_{12}$ dicarboxylic acids are octanedioic acid (suberic), nonanedioic acid (azelaic acid), decanedioic acid (sebacic acid), undecanedioic acid, and dodecanedioic acid, any of these alone, or two or more.

According to my invention, there is provided a prepolymer prepared by reacting (A) PACP or a methyl derivative thereof with (B) at least one $C_8$ to $C_{12}$ straight chain alkane dicarboxylic acid, preferably the $C_9$ diacid azelaic acid, or mixture thereof with adipic acid, employing a catalyst combination of manganous hypophosphite and water. When the mixture (B2) of acids is employed including adipic acid, the mixture preferably comprises about 20 to 65 mole percent adipic acid, with the balance selected from the higher straight chain alkane dicarboxylic acid or acids.

In preparation of the prepolymer, the desired amounts and ratios of PACP or methyl derivative thereof with the selected one or more dicarboxylic acids are admixed together with manganous hypophosphite, and water, employing in the range of about 20 to 500 ppm manganous hypophosphite, $Mn(H_2PO_2)_2$, based on weight of total monomers charged, with a presently preferred range of about 50 to 250 ppm. The amount of water employed should be in the range of about 7 to 50 weight percent based on total monomers charged, with a presently preferred range of about 8 to 40, and presently most preferred about 9–30 weight percent. Optionally, if desired, a small amount of manganous hypophosphite can be admixed with the prepolymer prior to the second stage polycondensation in the range of about 10 to 250 ppm.

The moles of diamine charged to the reactor to obtain the desired prepolymer presently preferably should be approximately equal to the total moles of diacid employed, i.e., a molar ratio of diamine:diacid of about 1:1. However, suitable prepolymer can be prepared in systems employing from up to about 2.75 percent molar excess of diamine to about a 1.75 percent molar excess of diacid (1.75 molar percent deficiency of diamine), presently preferred up to about 2.25 mole percent excess diamine to about 1.25 mole percent excess diacid, and presently more preferred about 1.25 mole percent excess diamine to about 1.25 mole percent excess diacid. It is presently considered that variations greater than these one way or the other do not produce suitable prepolymer, i.e., prepolymer suitable for further condensation polymerization to a high molecular weight product.

In the first stage, the monomeric reactants and catalyst components are charged to a suitable reactor means, such as an autoclave, which preferably has been purged of air using a sweep of a reaction-inert gas such as nitrogen, and then subjected to prepolymerization under elevated temperature and pressures by raising the temperature in the reactor means from ambient temperatures to such as about 175° to 245° C.; employing a pressure in the range of such as about 60 to 250 psig; over a time of such as about 5 to 120 minutes; presently 20 to 40 minutes, while holding the temperature at about the maximum reached previously.

The reactants then should be held at this reduced pressure, while still maintaining the maximum temperature, for a time of such as about 10 to 60 minutes, preferred about 20 to 40 minutes.

Thereafter, the reactor means are vented down to 0 psig, employing a reasonable time as may be convenient to avoid foaming of the reaction mass, such as about 10 to 60 minutes, more usually about 20 to 40 minutes.

Optionally, a nitrogen sweep step can be employed at this point, in order to remove all traces of water vapor to prevent polymer foaming.

The so-prepared product then is recovered, such as by extrusion, conveniently employing a broad recovery time of about 0 to 30 minutes, presently preferred about 2 to 15 minutes.

The following Table I summarizes the broad preferred and more preferred modes of preparing the prepolymer:

TABLE I

| Step | Ranges | Time (Minutes) | Temperature, | Pressure, psig |
|---|---|---|---|---|
| 1 | Broad Preferred | 5–120 | room tempeature→ 175–245 | 60–250 |
|  | More Preferred | 30–60 | room temperature→ 205–215 |  |
| 2 | Broad | 10–120 | hold at maximum | 60–250 |
|  | Preferred | 15–75 | temperature of Step 1 |  |
| 3 | Broad | 15–120 | 280–320 | 110–500 |
|  | Preferred | 30–90 | 300–315 | 350–450 |
| 4 | Broad | 10–120 | held at maximum | Pressure of Step 3 |
|  | Preferred | 15–60 | temperature of Step 3 |  |
| 5 | Broad | 10–60 | maximum | Pressure of Step→ 200–50 |
|  | Preferred | 20–40 | temperature of Step 3 | Pressure of Step 3→ 150–75 |
| 6 | Broad | 10–60 | maximum | Pressure of Step 5 |
|  | Preferred | 20–40 | temperature of Step 3 |  |
| 7 | Broad | 10–60 | maximum | Vent to zero |
|  | Preferred | 20–40 | temperature of Step 3 |  |
| 8 | Broad | 0–30 | maximum | (Pre-polymer recovery) zero |
|  | Preferred | 2–15 | temperature of Step 3 |  | more preferably raising the temperature to about 205°–215° C. over a time interval of about 30 to 60 minutes. The reactants should be maintained at this elevated temperature and pressure for an additional time of such as about 10 to 120 minutes, presently preferred about 15 to 75 minutes.

The temperature of the reactants then is further increased to such as about 280° to 320° C. over a period of such as about 15 to 120 minutes, preferably to temperatures of about 300° to 315° C. over a time of about 30 to 90 minutes. During this period, the pressure is adjusted to such as about 110 to 500 psig, preferably about 350 to 450 psig with venting, if necessary.

When the reactants have reached the maximum pressure and temperature above described, the reactants should be held for a time of such as about 10 to 120 minutes, presently preferred about 15 to 60 minutes.

The pressure in the reaction means thereupon should be gradually reduced to such as about 200 to 50 psig over a suitable time of such as about 10 to 60 minutes, preferably to about 150 to 75 psig over a time of about The product at this stage, which I consider the end of the first stage or prepolymerization stage, is termed a prepolymer and exhibits an inherent viscosity of about 0.6 to 0.95, most usually and preferably about 0.7 to 0.85. A prepolymer with such an inherent viscosity exhibits a low enough melt viscosity to allow 80 to 85 percent product extrusion from the prepolymerization reactor means, and yet has sufficient melt strength and toughness to substantially eliminate handling problems in further steps.

In the second stage of my process, the so-formed prepolymer is subjected to a further melt polymerization step employing temperatures in the range of about 250° to 310° C., presently preferred about 260° to 290° C., because in this temperature range the reaction rate is reasonably fast and thermal degradation of the polymer product is not.

At least the final portion of the reaction period of the second step is conducted at pressures in the range of about 0.005 to 20 mm Hg, presently preferred about 0.01 to 0.5 mm Hg because this pressure range is readily obtained and the reaction rate is faster at reduced pressure.

The second stage or polycondensation stage is carried out under an inert atmosphere, such as provided by nitrogen or one of the rare gases such as argon or the like. Residence times for the second stage can vary as desired, depending to some extent on temperature and pressure, as long as sufficient to produce a polymer of the desired inherent viscosity substantially higher than that of the prepolymer such as at least about 0.2 I.V. units and in the range of such as about 1 to 1.8, preferably about 1.1 to 1.7, more particularly at least about 1.2 to 1.4, yet residence times should be short enough to avoid polymer decomposition.

The second stage reaction time will vary depending on whether it is carried out batchwise such as in an autoclave or continuously such as in a devolatilization extruder. In continuous operations, residence times typically will vary from about 2 minutes to 60 minutes, more usually about 6 minutes to 20 minutes. In batch operations, reaction times typically will vary from about 30 minutes to 300 minutes. At these residence times throughput is reasonably fast coupled with a decreased probability of thermal degradation of the product polymer.

Thus, my first stage is substantially a melt polymerization employing elevated temperatures and pressures and a novel catalyst system, whereas the second stage wherein the prepolymer is further melt polymerized to a high inherent viscosity product can be characterized as an elevated temperature-low pressure polycondensation step.

The polycondensation second stage can be carried out in any suitable apparatus capable of heating the prepolymer to the desired temperature, has means for removing water vapor and other volatiles, and has means for reducing the pressure of at least the final portion of the reaction interval to the desired level. Thus, conventional autoclaves can be used, but devolatilizing reactor-extruders are particularly effective.

The prepolymer can be polycondensed, for example, in a continuous or discontinuous polymerization system incorporating a vented, devolatilizing extrusion zone. Pressure is employed to push heated prepolymer to a heated extruder, provided with at least one vacuum vent. The vent or vents provide passages wherein the atmospheric pressure is reduced. As the polymer in the heated extruder advances through the extrusion zone past the vent or vents, the reduced pressure areas allow evaporation of volatile components. Since the polycondensation is carried out as a one phase liquid procedure with a controlled polymerization rate, oxidation, gelation and degradation of the polymer is avoided.

EXAMPLES

The following examples are included to assist one skilled in the art to which the invention pertains. The particular components, relationships, ratios, temperatures, pressures, and the like, should be considered as illustrative of the scope of my invention, without needlessly limiting the reasonable scope thereof. Product compositions are indicated by notations such as PACP-9/6 (60/40) which indicates a polyamide of 2,2-bis(4-aminocyclohexyl)propane (PACP) with a 60/40 molar ratio mixture of the $C_9$ diacid (azelaic) and $C_6$ diacid (adipic).

EXAMPLE I

To a 5-gallon, anchor stirred stainless steel autoclave was charged 3501 g (14.69 moles) of 2,2-bis(4-aminocyclohexyl)propane (PACP), 1658.3 g (8.82 moles) azelaic acid, 858.2 g (5.87 moles) adipic acid, 1504 ml distilled water, 0.30 g (50 ppm) optical brightener, and 0.60 g (100 ppm) of manganous hypophosphite. The reactor was sealed and flushed with nitrogen by alternately pressuring the nitrogen and venting to zero psig several times. The stirrer was started (10 rpm), and the reactor was heated to 210° C. and maintained at this temperature for 30 minutes. The reactor temperature was increased to 310° C. with venting, as necessary, to maintain no more than 400 psig. The reactor was held at 310° C. at 400 psig for 15 minutes, and then was vented slowly to 100 psig over 30 minutes as the temperature was maintained at 310° C. The reactor temperature was maintained at 310° C. and 100 psig for 15 minutes before venting slowly to 0 psig over a period of 30 minutes. At this point, a plug was removed from the bottom of the reactor and nitrogen pressure was applied to extrude the molten prepolymer through the bottom drain hole. The prepolymer was extruded into a water quench bath wherein it was pulled to strand it. The strands were coiled into a large lever-pac and air-dried overnight.

The strands were clear and colorless except for a slight blue fluorescence in sunlight due to the optical brightener present. The prepolymer product had an inherent viscosity (I.V.) of 0.78 (0.5% m-cresol solution at 30° C.). End-group analysis showed 69 acid equivalents and 85 amine equivalents per $10^6$ g of polymer.

This prepolymer product of Run 1 possessed a sufficient number and balance of residual, unreacted acid and amine end groups to allow further condensation polymerization to high molecular weight polyamide as shown in Examples II-IV.

EXAMPLE II

A blend of the prepolymer product from Example I with that from four analogous runs gave a representative sample of PACP-9/6 (60/40) prepolymer of I.V. 0.79 for finishing to a high molecular weight polyamide.

A 6 g portion of the above PACP-9/6 (60/40) prepolymer sample of 0.79 I.V. was charged to a small laboratory glass reactor which was flushed with nitrogen by alternately evacuating and pressuring to 15-20 psig $N_2$ three times. A slow stream of nitrogen then was maintained through the reactor as it was heated from 150° C. to 320° C. during a period of 30 minutes. The reactor then was held at 320° C. under $N_2$ flush for 1 hour. The pressure then was reduced to 20 mm Hg and maintained at 320° C. for 1 hour with a small $N_2$ bleed through the reactor. The reactor was finally pressured to 0 psig with $N_2$ and allowed to cool under a nitrogen flush. The reactor was broken to remove the polymer of this Run 2 which possessed an inherent viscosity of 1.20 (0.5% m-cresol solution at 30° C.).

Run 2 illustrates the finishing step or second step of my inventive process to produce a high inherent viscosity product.

EXAMPLE III

A 120 g sample of a prepolymer PACP-9/6 (60/40) of I.V. 0.77 prepared as in Example I was placed in a 1-liter anchor-stirred (12 rpm) stainless steel autoclave. The reactor was flushed with nitrogen by alternately pressuring to 120 psig with $N_2$ and venting to 0 psig a total of four times. The reactor then was heated from room temperature to 305° C. over a period of 45 minutes under N₂ flush and was maintained at 305° C. for 30 minutes with N₂ flush. The pressure then was reduced to 20 mm Hg over a 30 minute period at 305° C. and held at this temperature for 30 minutes with a slight N₂ bleed through the reactor. The reactor was pressured to 120 psig N₂, sealed, and cooled to room temperature. Stirring the reactor contents during cooling was continued for 30 minutes to wrap the viscous product around the stirrer shaft to facilitate product removal. After cooling overnight, the reactor was opened and the product of Run 3 PACP-9/6 (60/40) high molecular weight polyamide was removed by chipping. The polyamide exhibited an I.V. of 1.41 (0.5% m-cresol solution at 30° C.).

This Run 3 illustrates that the PACP-9/6 (60/40) prepolymer can be effectively finished to a high molecular weight (high inherent viscosity) polyamide. Again, use of laboratory apparatus resulted in inconvenience in the recovery of product material.

EXAMPLE IV

A sample of a PACP-9/6 (60/40) prepolymer of I.V. = 0.77 prepared as in Example I was melted under an inert atmosphere, and the melt was charged to a continuous devolatilization reactor (Baker-Perkins Poly-Con ®R-100 stainless steel reactor). At a pressure of 0.10 mm Hg, a temperature of 279° C., a residence time of 12.1 minutes, and a rotor speed of 21 rpm, the product of Run 4 was extruded which exhibited an I.V. of 1.3.

Run 4 demonstrated that a devolatilization reactor means is applicable and convenient for large-scale production of high I.V. material suitable for commercial applications.

EXAMPLE V

To a 1-liter stirred stainless steel autoclave were charged 118.1 g (0.495 mole) 2,2-bis(4-aminocyclohexyl)propane (PACP), 55.94 g (0.297 mole) azelaic acid, 28.95 g (0.198 mole) adipic acid, 50.7 ml distilled water, and 0.02 g (100 ppm) manganous hypophosphite. The reaction was carried out in essentially the same manner as described in Example I. The resulting PACP-9/6 (60/40) prepolymer exhibited an inherent viscosity of 0.80.

A 5 g sample of the prepolymer was weighed into a flask for conversion to high molecular weight polyamide. The system was alternately pressured with N₂ and evacuated prior to thermal polymerization of the prepolymer under N₂. The system was heated from 120° C. to 320° C. over a 30-minute period under N₂ flush, and then maintained at 320° C. for 1 hour. The pressure of the system then was reduced to 20 mm Hg and the temperature was held at 320° C. The product of Run 5 was colorless and possessed an inherent viscosity of 1.25.

Run 5, when compared with Run 6 as shown in Table II below, demonstrates the necessity of using manganous hypophosphite in the first stage of my process in order to obtain a prepolymer suitable for further polycondensation to a high molecular weight.

EXAMPLE VI

The same charge and procedure was followed in this Example as described in Example V above, except for the omission of manganous hypophosphite. The polymeric product of Run 6 had an inherent viscosity of only 0.64, and the final product exhibited an inherent viscosity of only 0.88, the relatively minor increase obtained by the second stage condensation polymerization. Thus, the prepolymer prepared without the manganous hypophosphite was unsuitable for further condensation polymerization to result in a high molecular weight polyamide with a desired high I.V. The following Table II compares the runs directly:

Table II

| Run | Example | Mn(H₂PO₂)₂ | Polymeric Product I.V.-Step a | I.V. After Final Thermal Polycondensation Step b |
|---|---|---|---|---|
| 5 - Inventive | V | 100 ppm | 0.80 | 1.25 |
| 6 - Control | VI | None | 0.64 | 0.88 |

As can be seen from these results, the product of the control Run 6 was not convertible to a high molecular weight polyamide. These runs again demonstrate the necessity of using manganous hypophosphite in the first stage of my process in order to obtain a prepolymer suitable for further polymerization to a high molecular weight.

EXAMPLE VII

To a 5-gallon, anchor-stirred stainless steel autoclave was charged 3,574 g (15 moles) PACP, 1,692.9 g (9 moles) azelaic acid, 876.11 g (6 moles) adipic acid, 0.6143 g (100 ppm) manganous hypophosphite Mn(H₂PO₂)₂, 0.3072 g (50 ppm) of a commercially available optical brightener OB-1 [4,4'-bis(benzoxazole-2-yl)stilbene], and 614 ml (10 weight percent relative to the monomers) of distilled water.

The reactor was sealed, and flushed with nitrogen by alternately pressuring with nitrogen and venting to 0 psig several times. The stirrer was started at a rate of about 10 rpm, and the reactor contents heated to about 210° C. and maintained at this temperature for about 30 minutes, at which time the pressure was about 70 psig. The reactor temperature was increased to 310° C., the pressure increasing at the higher temperature to about 400 psig, at which temperature over a period of 15 minutes venting was commenced sufficient to hold the pressure at about 100 psig. After about 15 minutes, the pressure was gradually vented to 0 psig over an interval of about 1 hour. Material of this Run 7 was extruded from the reactor at about 100 psig employing nitrogen pressure, and the inherent viscosity of this prepolymer sample was about 0.66.

In a comparison Run 8 made substantially the same way, but omitting the water, 3500 g (14.7 moles) PACP were admixed with 1657.8 g (8.8 moles) azelaic acid, 857.97 g (5.87 moles) adipic acid, 0.3007 g (50 ppm) of optical brightener (OB-1), and 0.6016 g (100 ppm) manganous hypophosphite, and added to a reactor. The reactor was flushed with nitrogen several times, and sealed under 20 psig nitrogen pressure. The contents were heated over about 1 hour to a temperature of about 600° F. (315° C.), the contents reaching a maximum pressure of about 60 to 70 psig. When a temperature of 600° F. (315° C.) was reached, the contents thereupon were slowly vented over about 1½ hours to reduce the pressure substantially down to 0 psig, at which time the contents were extruded rapidly at 100 psig using nitrogen pressure. The product of Run 8 had a yellow color and was quite brittle, so brittle even that it could not be handled adequately during extrusion. When the reactor head was removed, the material remaining inside was heterogeneous, indicating incomplete reaction. Some opaque white, powderlike material, some distinctly yellow material, and other varieties were observed, indicating that a variety of types of products had been produced, which was an undesirable aspect.

Runs 7 and 8 demonstrate the necessity and importance of including water in the formation of the prepolymer.

EXAMPLE VIII

The following runs demonstrate the importance of monomer stoichiometry in prepolymer production.

Run 9 utilized an equimolar mixture of diacids and diamine, and was carried out in the same manner as the run described in Example I with the following charge:

3409 g (14.30 moles) of 2,2-bis(4-aminocyclohexyl)propane (PACP)
1615 g (8.58 moles) of azelaic acid
835.7 g (5.72 moles) of adipic acid
0.2930 g (50 ppm) of 4,4'-bis(benzoxazole)-2-yl)stilbene
0.5860 g (100 ppm) of manganous hypophosphite
1465 ml of distilled water.

Run 10 utilized a 1 molar percent excess of diacids, and was similarly carried out with the following charge to the reactor:

3417 g (14.33 moles) of 2,2-bis(4-aminocyclohexyl)propane (PACP)
1635 g (8.686 moles) of azelaic acid
846 g (5.791 moles) of adipic acid
0.2949 g (50 ppm) of 4,4'-bis(benzoxazole-2-yl)stilbene
0.5898 g (100 ppm) of manganous hypophosphite
1475 ml of distilled water.

Run 11 utilized a 1 molar percent excess of diamine, and was similarly carried out with the following charge to the reactor:

3474 g (14.57 moles) of 2,2-bis(4-aminocyclohexyl)propane (PACP)
1629 g (8.657 moles) of azelaic acid
843.2 g (5.771 moles) of adipic acid
0.2973 g (50 ppm) of 4,4'-bis(benzoxazole-2-yl)stilbene
0.5946 g (100 ppm) of manganous hypophosphite
1487 ml of distilled water.

The essential results of these Runs 9, 10, and 11 are shown in Table III below:

Table III

Monomer Stoichiometry in Prepolymer Production

| Run No. | Molar % Excess Diacids | Molar % Excess PACP | Step A Prepolymer | After Second Stage Polycondensation Step b |
|---|---|---|---|---|
| 9 | None (i.e., Equimolar) | None (i.e., Equimolar) | 0.86 | 1.69 |
| 10 | 1.0 | | 0.80 | 1.20 |
| 11 | | 1.0 | 0.80 | 1.51 |

Inherent Viscosity

The data in Table III show that a slight excess of either diacids or diamines can be used but that equimolar amounts of diacids and diamine gives best results.

Polyamides prepared from 2,2-bis(4-aminocyclohexyl)propane and/or its methyl derivatives, with the high molecular weight straight chain alkane dicarboxylic acids, optionally further with adipic acid, as I have described, are useful in the production of engineering thermoplastics, as packaging materials, and the like.

The polyamides of my invention prepared in accordance with my process can be blended with fillers, pigments, stabilizers, softeners, extenders, other polymers, a variety of fillers such as graphite, carbon black, titanium dioxide, carbon fibers, silica, asbestos, cotton floc, and the like, in the usual manner.

The disclosure, including the data, has illustrated the value and effectiveness of my invention. The examples, the knowledge and background of the field of the invention and of general principles of chemistry and other applicable sciences, have formed the bases from which the broad descriptions of the invention including the ranges of conditions and generic conditions of operant components have been developed, and have formed the bases for my claims here appended.

I claim:

1. A process for preparing a polyamide which comprises the steps of:
    a. heating at least one (A) diamine and at least one (B) diacid employing a molar ratio of diamine:diacid from about 2.75 percent molar excess of diamine to about 1.75 percent molar excess of diacid, employing an effective amount of a catalyst system comprising manganous hypophosphite and water, at elevated temperatures and pressures, and for a time sufficient, to obtain a prepolymer exhibiting an inherent viscosity in the range of about 0.6 to 0.95 as measured at 0.5 wt. % in m-cresol solution at 30° C, and
    b. heating said prepolymer at elevated temperatures under substantially vacuum conditions for an effective time, thereby polycondensing said prepolymer to a polyamide product exhibiting an inherent viscosity higher than that of said prepolymer, and in the range of about 1 to 1.8,
    wherein said (A) diamine is 2,2-bis(4-aminocyclohexyl)propane or methyl derivatives thereof wherein each cyclohexyl ring has 0–1 methyl group, and
    wherein said (B) diacid is an alkane straight chain dicarboxylic acid selected from the group consisting of (B1) at least one $C_8$ to $C_{12}$ diacid, and (B2) adipic acid and at least one $C_8$ to $C_{12}$ diacid.

2. The process according to claim 1 wherein said (B) alkane straight chain dicarboxylic acid is (B1) at least one $C_8$ to $C_{12}$ diacid and is selected from the group consisting of suberic, azelaic, sebacic, undecanedioic, dodecanedioic, or mixture.

3. The process according to claim 2 wherein said step heating (a) comprises the substeps
    a1. heating an admixture of said at least one (A) diamine, said at least one (B) diacid, and said catalyst system to a temperature of about 175° to 245° C. employing an elevated pressure of about 60 to 250 psig,
    a2. holding the heated admixture from step (a1) at the elevated temperature and pressure reached in said step (a1) for about 10 to 120 minutes,
    a3. further increasing the temperature of said admixture from step (a2) to about 280° to 320° C. at a further pressure in the range of about 110 to 500 psig over a time of about 15 to 120 minutes, a4. holding the admixture at the increased temperature and further pressure for about 10 to 120 minutes, a5. reducing the pressure on the admixture from step (a4) to about 200 to 50 psig over a time of about 10 to 60 minutes while maintaining the temperature in the range reached in step (a4), a6. holding the admixture from step (a5) at the elevated temperatures and reduced pressures for about 10 to 60 minutes, a7. further reducing the pressure to zero psig over a time of about 10 to 60 minutes while maintaining the elevated temperatures, a8. recovering the product from said step (a7) as a prepolymer.

4. The process according to claim 3 wherein said polycondensing step (b) employs a temperature in the range of about 250° to 310° C., and a pressure in the range of about 0.005 mm Hg to 20 mm Hg.

5. The process according to claim 4 wherein the amount of manganous hypophosphite employed is in the range of about 20 to 500 ppm relative to the total monomers charged diacid plus diamine, and wherein said water is employed in a range of about 7 to 50 weight percent relative to total monomers diamine plus diacid employed.

6. The process according to claim 5 wherein said step a1. employs a time of about 30 to 60 minutes, and reaches a temperature of about 205° to 215° C.;

a2. employs a time of about 15 to 75 minutes;

a3. employs a time of about 30 to 90 minutes, a pressure of about 350 to 450 psig, and a temperature of about 300° to 315° C.;

a4. employs a time of about 15 to 60 minutes; employs a time of about 20 to 40 minutes and reaches a reduced pressure of about 150 to 75 psig;

a6. employs a time of about 20 to 40 minutes;

a7. employs a time of about 20 to 40 minutes.

7. The process according to claim 6 wherein said step (b) employs a temperature in the range of about 260° to 290° C., and a pressure in the range of about 0.01 mm Hg to 0.5 mm Hg.

8. The process according to claim 7 employing said manganous hypophosphite in the range of about 50 to 250 ppm, and said water in the range of about 8 to 40 weight percent, and wherein said diamine:diacid ratio in said step (a) is in the range of about 1.75 mole percent excess diamine to 1.25 mole percent excess diacid.

9. The process according to claim 8 wherein said prepolymer from said step (a) exhibits an inherent viscosity of about 0.7 to 0.85, and said polyamide product from said step (b) exhibits an inherent viscosity of about 1.1 to 1.7.

10. The process according to claim 9 wherein said diamine and diacid are charged in approximately a 1:1 molar ratio.

11. The process according to claim 10 wherein said diamine is 2,2-bis(4-aminocyclohexyl)propane, and said diacid is azelaic acid.

12. The process according to claim 1 wherein said (B) diacid is said (B2) adipic acid with at least one of suberic, azelaic, sebacic, undecanedioic, dodecanedioic acid, or mixture.

13. The process according to claim 12 wherein said (B2) acids comprises about 20 to 65 mol percent adipic acid.

14. The process according to claim 13 wherein said step heating (a) comprises the substeps a1. heating an admixture of said at least one (A) diamine, said at least one (B) diacid, and said catalyst system to a temperature of about 175° to 245° C. employing an elevated pressure of about 60 to 250 psig, a2. holding the heated admixture from step (a1) at the elevated temperature and pressure reached in said step (a1) for about 10 to 120 minutes, a3. further increasing the temperature of said admixture from step (a2) to about 280° to 320° C. at a further pressure in the range of about 110 to 500 psig over a time of about 15 to 120 minutes, a4. holding the admixture at the increased temperature and further pressure for about 10 to 120 minutes, a5. reducing the pressure on the admixture from step (a4) to about 200 to 50 psig over a time of about 10 to 60 minutes while maintaining the temperature in the range reached in step (a4), a6. holding the admixture from step (a5) at the elevated temperature and reduced pressures for about 10 to 60 minutes, a7. further reducing the pressure to zero psig over a time of about 10 to 60 minutes while maintaining the elevated temperatures, a8. recovering the product from said step (a7) as a prepolymer.

15. The process according to claim 14 wherein said polycondensing step (b) employs a temperature in the range of about 250° to 310° C., and a pressure in the range of about 0.005 mm Hg to 20 mm Hg.

16. The process according to claim 15 wherein the amount of manganous hypophosphite employed is in the range of about 20 to 500 ppm relative to the total monomers charged diacid plus diamine, and wherein said water is employed in a range of about 7 to 50 weight percent relative to total monomers diamine plus diacid employed.

17. The process according to claim 16 wherein said step a1. employs a time of about 30 to 60 minutes, and reaches a temperature of about 205° to 215° C.;

a2. employs a time of about 15 to 75 minutes;

a3. employs a time of about 30 to 90 minutes, a pressure of about 350 to 450 psig, and a temperature of about 300° to 315° C.;

a4. employs a time of about 15 to 60 minutes, a5. employs a time of about 20 to 40 minutes and reaches a reduced pressure of about 150 to 75 psig;

a6. employs a time of about 20 to 40 minutes;

a7. employs a time of about 20 to 40 minutes.

18. The process according to claim 17 wherein said step (b) employs a temperature in the range of about 260° to 290° C., and a pressure in the range of about 0.01 mm Hg to 0.5 mm Hg.

19. The process according to claim 18 employing said manganous hypophosphite in the range of about 50 to 250 ppm, said water in the range of about 8 to 40 weight percent, and wherein said diamine:diacid ratio in said step (a) is in the range of about 2.25 mole percent excess diamine to about 1.25 mole percent excess diacid.

20. The process according to claim 19 wherein said prepolymer from said step (a) exhibits an inherent viscosity of about 0.7 to 0.85, and said polyamide product from said step (b) exhibits an inherent viscosity of about 1.1 to 1.7.

21. The process according to claim 20 wherein said diamine and diacid are charged in approximately a 1:1 molar ratio.

22. The process according to claim 21 wherein said diacid is an admixture of azelaic acid and adipic acid.

23. The process according to claim 14 further employing about 10 to 250 ppm manganous hypophosphite in said step (b), and a ratio of diamine:diacid from about 1.25 percent molar excess of diamine to about 1.25 percent molar excess of diacid.

24. The process according to claim 13 wherein said (B) diacid is said (B2) adipic acid with azelaic acid.

25. The process according to claim 24 wherein said admixture of acids comprises 40 mol percent adipic acid and 60 mol percent azelaic acid.

26. The process according to claim 22 wherein said diacid is an admixture of azelaic acid and adipic acid in a mol ratio of 60:40.

27. A process for preparing a polyamide which comprises the steps of:
   a. heating at least one (A) diamine and at least one (B) diacid employing a molar ratio of diamine:diacid from about 2.75 percent molar excess of diamine to about 1.75 percent molar excess of diacid, employing about 20 to 500 ppm manganous hypophosphite and about 7 to 50 weight percent water, based on total monomers, at elevated temperatures and pressures, and for a time sufficient, to obtain a prepolymer exhibiting an inherent viscosity in the range of about 0.6 to 0.95 as measured at 0.5 wt. % in m-cresol solution at 30° C, and
   b. heating said prepolymer at elevated temperatures under substantially vacuum conditions for an effective time, thereby polycondensing said prepolymer to a polyamide product exhibiting an inherent viscosity higher than that of said prepolymer and in the range of about 1 to 1.8,
   wherein said (A) diamine is 2,2-bis(4-aminocyclohexyl)propane or methyl derivatives thereof wherein each cyclohexyl ring has 0-1 methyl group, and
   wherein said (B) diacid is an alkane straight chain dicarboxylic acid selected from the group consisting of (B1) at least one $C_8$ to $C_{12}$ diacid, and (B2) adipic acid and at least one $C_8$ to $C_{12}$ diacid.

28. A process for preparing a polyamide which comprises the steps of:
   a. heating at least one (A) diamine and at least one (B) diacid employing about 20 to 500 ppm of manganous hypophosphite and about 7 to 50 weight percent of water, relative to total monomers diamine plus diacid employed, employing a mole ratio of diamine:diacid effective and at effective elevated temperatures and pressures and for a sufficient time, thereby preparing a prepolymer exhibiting a relatively low inherent viscosity and capable of subsequent polycondensation to a polymer exhibiting an inherent viscosity of at least about 1 to 1.8, wherein said inherent viscosity is measured at 0.5% in m-cresol solution at 30° C, and
   b. heating said prepolymer at elevated temperatures under substantially vacuum conditions for an effective time, thereby polycondensing said prepolymer to a polyamide product exhibiting an inherent viscosity substantially higher than that of said prepolymer and at least about 1,
   wherein said (A) diamine is 2,2-bis(4-aminocyclohexyl)propane or methyl derivatives thereof wherein each cyclohexyl ring has 0-1 methyl group, and
   wherein said (B) diacid is an alkane straight chain dicarboxylic acid selected from the group consisting of (B1) at least one $C_8$ to $C_{12}$ diacid, and (B2) an admixture of adipic acid and at least one $C_8$ to $C_{12}$ diacid.

29. The process according to claim 28 wherein said ratio of (A):(B) is in the range of a molar excess of diamine up to about 2.75 percent to a molar excess of diacid of about 1.75 percent; and
   said polyamide product exhibits an inherent viscosity at least about 0.2 unit higher than that of the prepolymer.

30. The process according to claim 29 wherein said (A) is 2,2-bis(4-aminocyclohexyl)propane, and said (B) alkane straight chain dicarboxylic acid is said (B1) and is suberic, azelaic, sebacic, undecanedioic, dodecanedioic, or mixture.

31. The process according to claim 29 wherein said (A) is 2,2-bis(4-aminocyclohexyl)propane, and said (B) diacid is said (B2) wherein said at least one $C_8$ to $C_{12}$ diacid is azelaic acid.

32. The process according to claim 31 wherein in said (B2) diacids, said adipic acid represents about 20 to 65 mole percent.

33. A process for preparing a polyamide which comprises the steps of:
   a. reacting at least one (A) diamine and at least one (B) diacid at elevated temperatures and pressures employing manganous hypophosphite and water effective to catalyze said reacting, and wherein the mole ratio of (A):(B) is effective to obtain a prepolymer exhibiting an inherent viscosity in the range of about 0.6 to 0.95 wherein said inherent viscosity is measured at 0.5% in m-cresol solution at 30° C, and
   b. heating said prepolymer at elevated temperatures under substantially vacuum conditions for an effective time, thereby polycondensing said prepolymer to a polyamide product exhibiting an inherent viscosity in the range of about 1 to 1.8 and at least about 0.2 higher inherent viscosity than that of said prepolymer,
   wherein said (A) diamine is 2,2-bis(4-aminocyclohexyl)propane or methyl derivative thereof wherein each cyclohexyl ring has 0-1 methyl groups, and
   wherein said (B) diacid is an alkane straight chain dicarboxylic acid selected from the group consisting of (B1) at least one $C_8$ to $C_{12}$ diacid, and (B2) an admixture of adipic acid and at least one $C_8$ to $C_{12}$ diacid.

34. The process according to claim 33 wherein said (B) $C_8$ to $C_{12}$ diacid is suberic, azelaic, sebacic, undecanedioic, dodecanedioic, or mixture.

35. The process according to claim 34 wherein the amount of manganous hypophosphite employed is in the range of about 20 to 500 ppm relative to the total monomers charged diacid plus diamine, and wherein said water is employed in a range of about 7 to 50 weight percent relative to total monomers diamine plus diacid employed.

36. The process according to claim 35 employing said manganous hypophosphite in the range of about 50 to 250 ppm and said water in the range of about 8 to 40 weight percent, and wherein said (A) diamine:(B) diacid ratio in said step (a) is within the range of about 2.75 percent molar excess of (A) diamine to about 1.75 percent molar excess of (B) diacid.

37. The process according to claim 36 wherein said prepolymer from said step (a) exhibits an inherent viscosity in the range of about 0.6 to 0.95, and said polyamide product from said step (b) exhibits an inherent viscosity in the range of about 1 to 1.8.

38. The process according to claim 37 wherein said prepolymer from said step (a) exhibits an inherent viscosity in the range of about 0.7 to 0.85, and said polyamide product from said step (b) exhibits an inherent viscosity in the range of about 1.1 to 1.7.

39. The process according to claim 38 wherein said diamine and diacid are charged in a molar ratio sufficient to provide in the range of about 1.25 percent molar excess of (A) diamine to 1.25 percent molar excess of (B) diacid.

40. The process according to claim 39 wherein said diamine is 2,2-bis(4-aminocyclohexyl)propane, and said diacid is azelaic acid.

41. The process according to claim 39 wherein said diacid is said (B2) mixture of said adipic acid with at least one of suberic, azelaic, sebacic, undecanedioic, dodecanedioic acid, or mixture.

42. The process according to claim 41 wherein said admixture of acids comprises about 20 to 65 mol percent adipic acid.

43. The process according to claim 42 wherein said diacid is an admixture of azelaic acid and adipic acid.

44. The process according to claim 43 wherein said diamine and total diacid are charged in approximately a 1:1 molar ratio.

45. A process for preparing a polyamide which comprises the steps of:
 a. heating at least one (A) diamine and at least one (B) diacid employing an effective amount of a catalyst system comprising manganous hypophosphite, and water, a mole ratio of diamine:diacid effective and at effective elevated temperatures and pressures and for a sufficient time, thereby preparing a prepolymer exhibiting a relatively low inherent viscosity and capable of subsequent polycondensation to a polymer exhibiting an inherent viscosity of at least about 1 to 1.8, wherein said inherent viscosity is as measured at 0.5 percent in m-cresol solution at 30° C., and
 b. heating said prepolymer at elevated temperatures under substantially vacuum conditions for an effective time, thereby polycondensing said prepolymer to a polyamide product exhibiting an inherent viscosity substantially higher than that of said prepolymer and in the range of about 1 to 1.8,
wherein said (A) diamine is 2,2-bis(4-aminocyclohexyl)propane or methyl derivatives thereof wherein each cyclohexyl ring has 0–1 methyl group, and
wherein said (B) diacid is an alkane straight chain dicarboxylic acid selected from the group consisting of (B1) at least one $C_8$ to $C_{12}$ diacid, and (B2) an admixture of adipic acid and at least one $C_8$ to $C_{12}$ diacid.

* * * * *

UNITED STATES PATENT AND TRADEMARK OFFICE
CERTIFICATE OF CORRECTION

PATENT NO. : 4,097,469

DATED : Jun. 27, 1978

INVENTOR(S) : Robert S. Shue

It is certified that error appears in the above-identified patent and that said Letters Patent are hereby corrected as shown below:

Col. 11, Cl. 6, line 9, before "employs" insert --- a5. ---.

Col. 16, Cl. 45, line 5, delete the comma after "hypophosphite"

Signed and Sealed this

Twenty-seventh Day of March 1979

[SEAL]

Attest:

RUTH C. MASON
Attesting Officer

DONALD W. BANNER
Commissioner of Patents and Trademarks